UNITED STATES PATENT OFFICE.

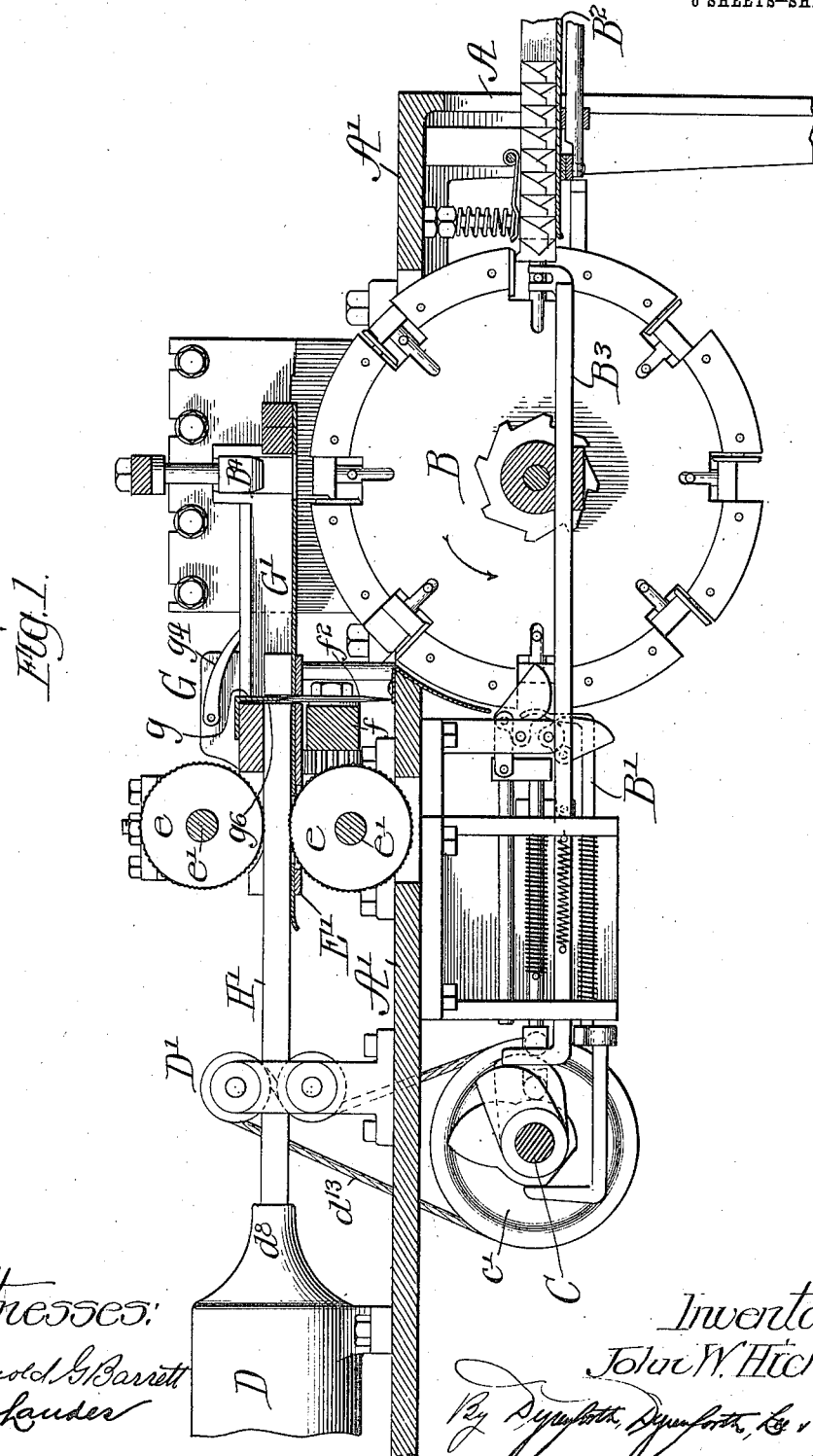

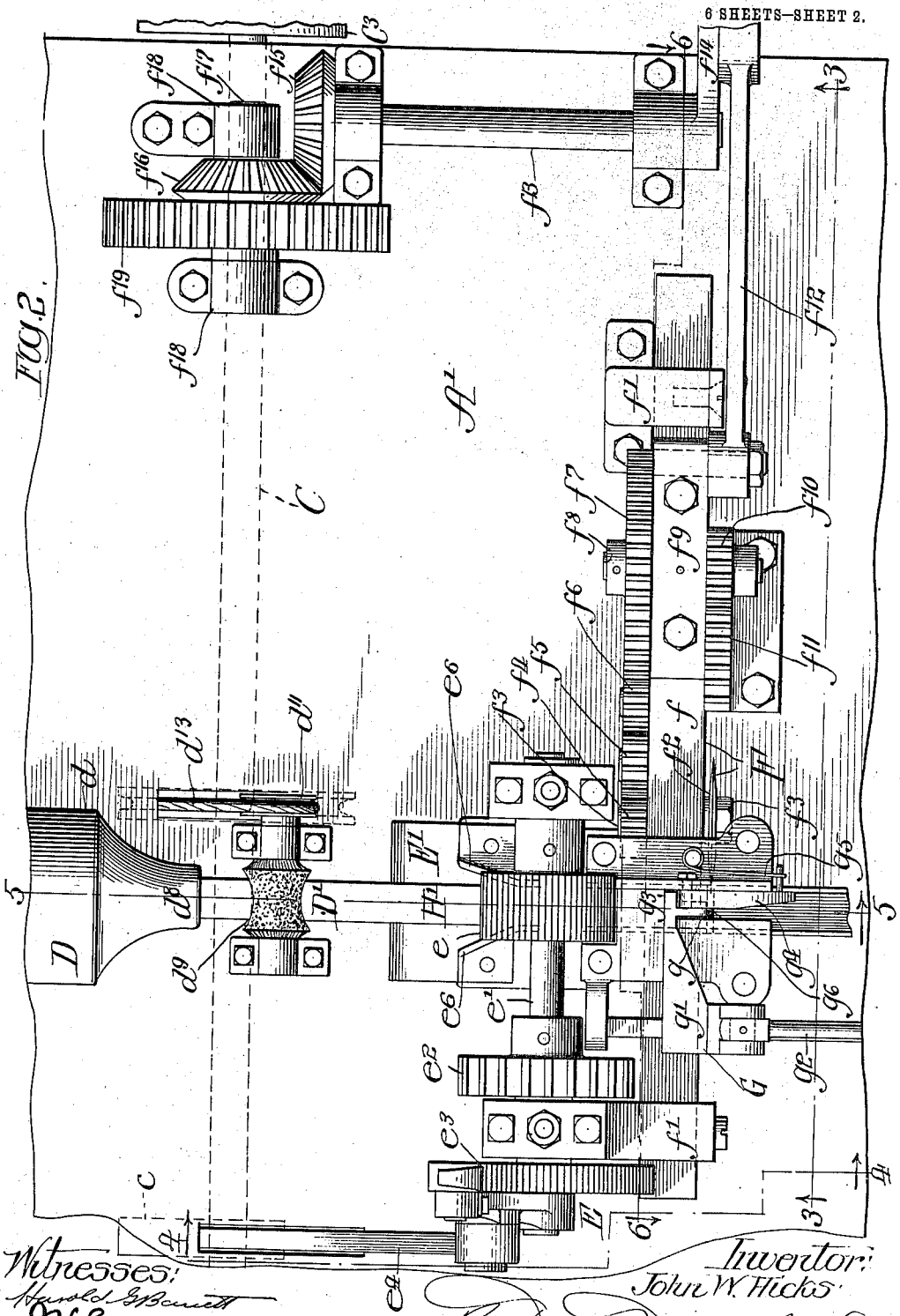

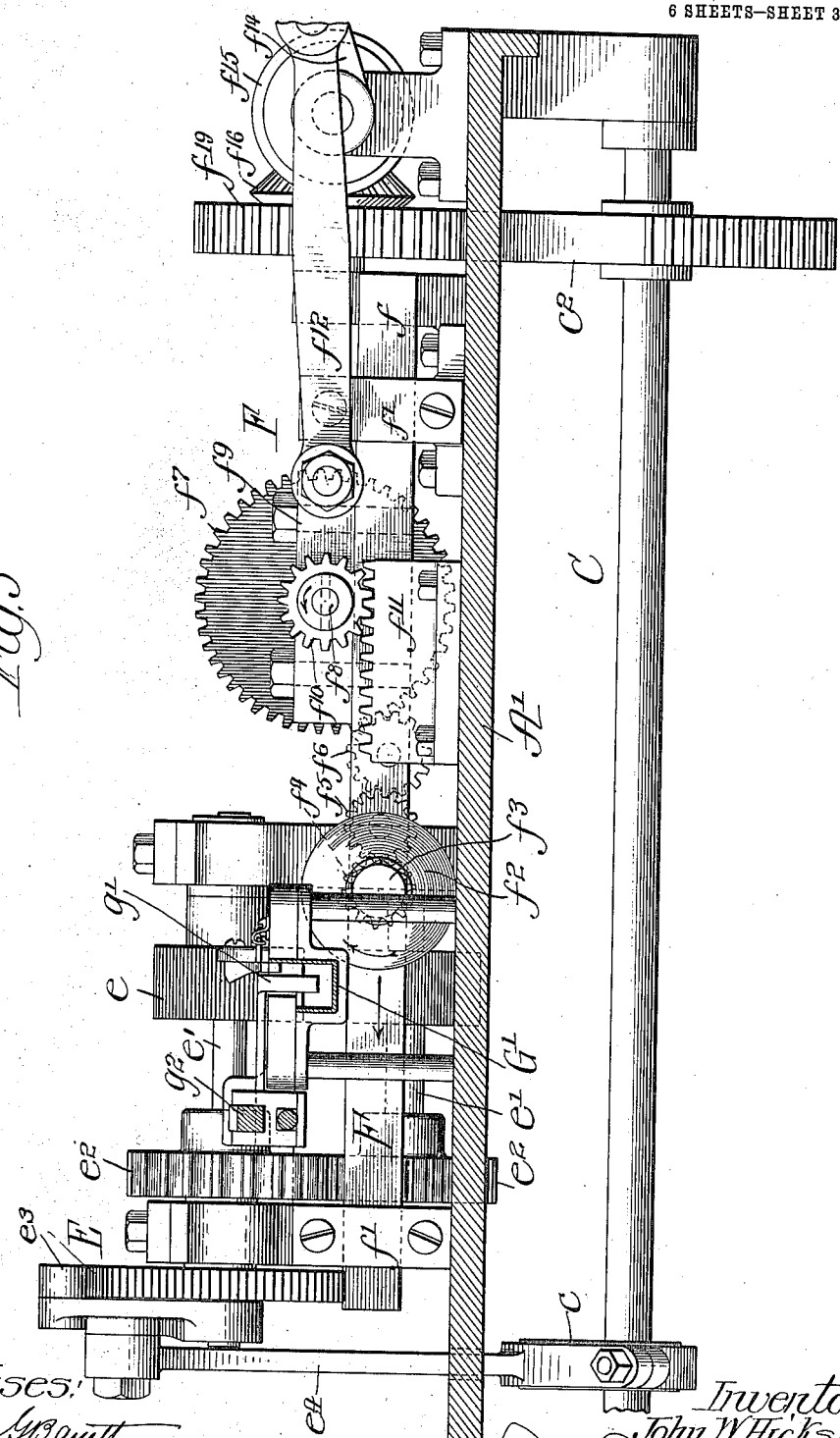

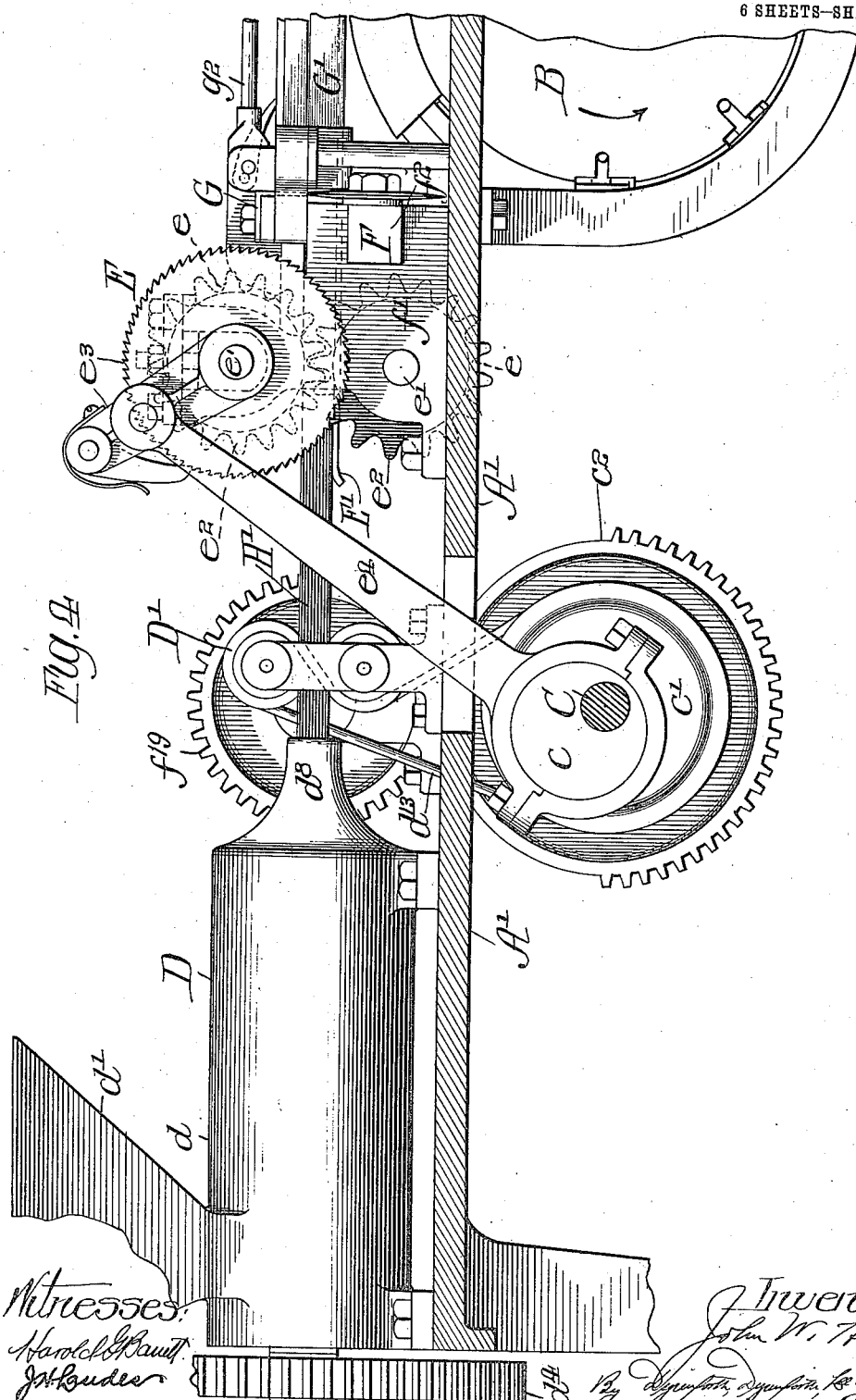

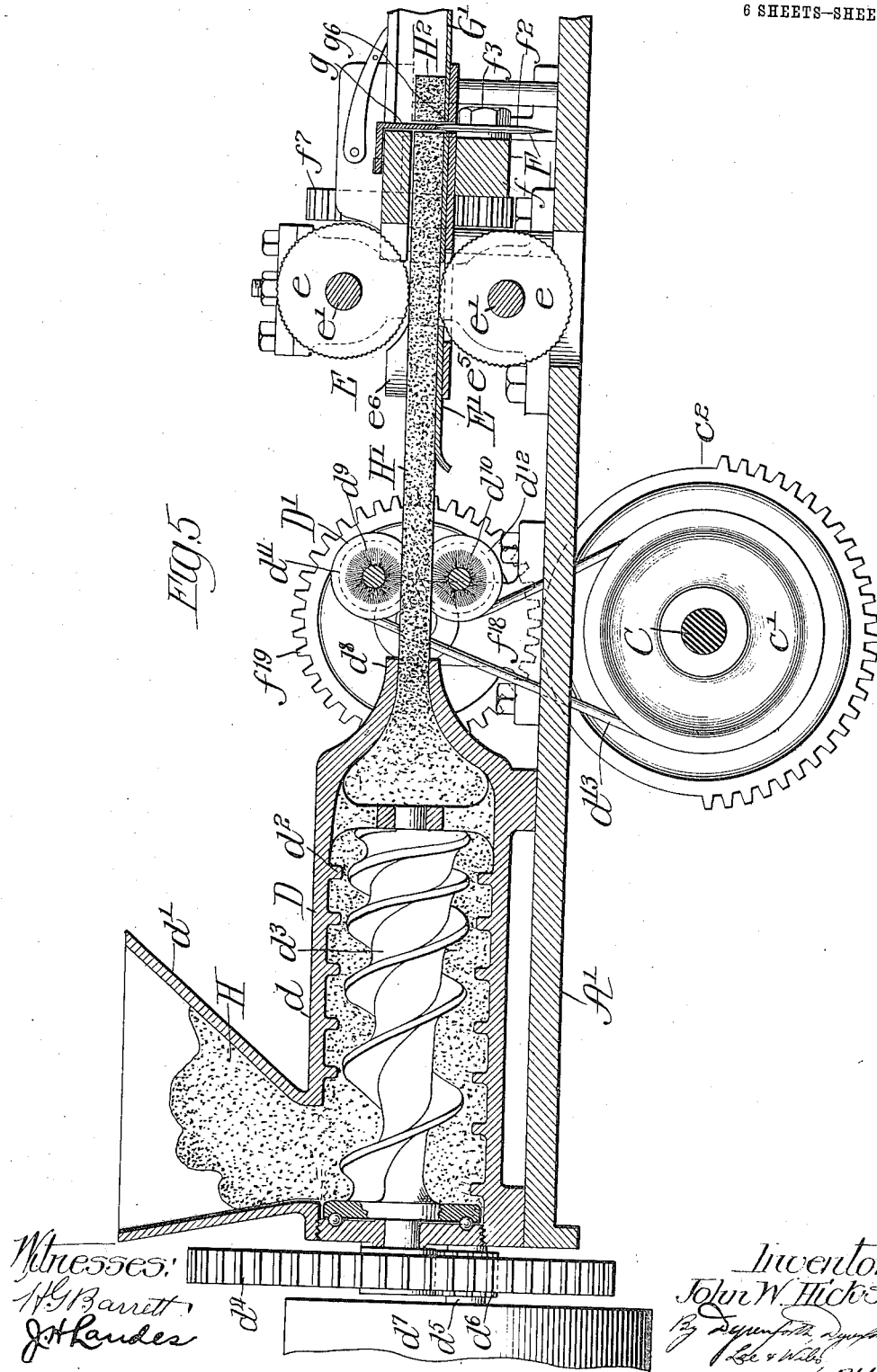

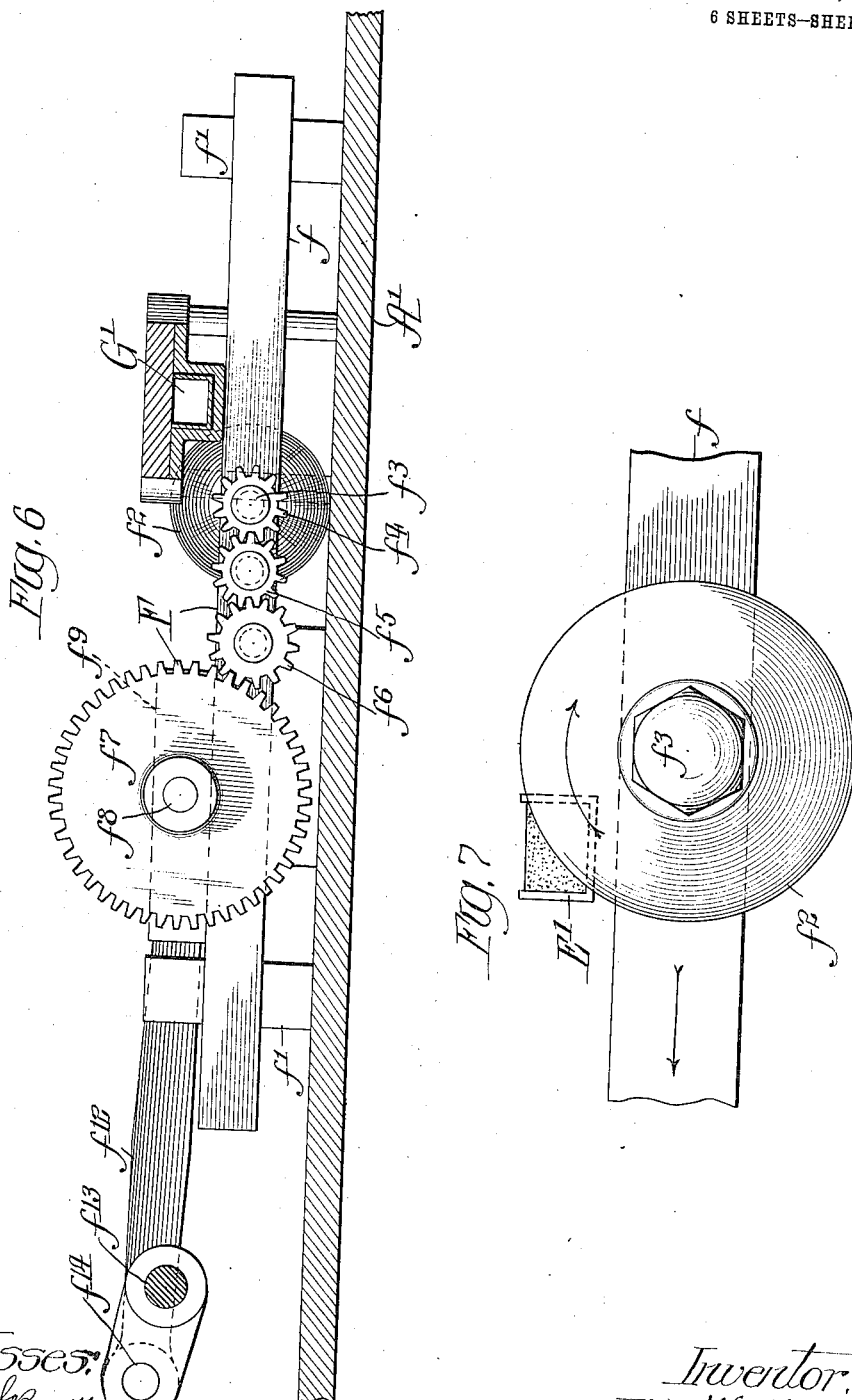

JOHN W. HICKS, OF CHICAGO, ILLINOIS, ASSIGNOR TO ORIENTAL CANDY CO., A CORPORATION OF ILLINOIS.

FORMING AND WRAPPING MACHINE.

1,044,048.  Specification of Letters Patent.  Patented Nov. 12, 1912.

Application filed February 12, 1907. Serial No. 356,972.

*To all whom it may concern:*

Be it known that I, JOHN W. HICKS, a citizen of the United States, residing at 250 West Jackson Boulevard, Chicago, in the county of Cook and State of Illinois, have invented a new and useful Improvement in Forming and Wrapping Machines, of which the following is a specification.

My invention relates particularly to machines for forming caramel-strips, sizing the same, severing them into cubes and wrapping the cubes.

My primary object is to provide a thoroughly practicable machine capable of forming the articles of confectionery from material in bulk and wrapping said articles.

An additional object is to provide improved means for severing a strip of plastic material, such as a caramel-strip, with a view to obtaining a clean cut and avoiding gumming of the cutter.

The invention constitutes an improvement on the wrapping machine described in my application No. 337,833, filed October 6, 1906, and certain features of construction claimed in said application are illustrated in the present application only so far as is necessary to enable the improvements herein claimed to be understood.

The invention is illustrated in its preferred embodiment in the accompanying drawings, in which—

Figure 1 represents a broken longitudinal vertical sectional view of my improved machine as employed for forming caramel-strips, sizing the same, severing the strips into cubes and wrapping the cubes; Fig. 2, a broken plan view of said machine, showing more particularly the portions of the mechanism employed in forming and sizing the strip and then cutting the strip into cubes; Fig. 3, a broken transverse vertical section taken as indicated at line 3 of Fig. 2, showing details of a reciprocating bar and a rotary cutter carried thereby and the operating means therefor; Fig. 4, a broken vertical section taken as indicated at line 4 of Fig. 2 and showing particularly the means for feeding the caramel-strip to the cutter after the strip issues from the mechanism which forms it; Fig. 5, a broken section taken as indicated at line 5 of Fig. 2 and showing additional details of the mechanism shown in Fig. 4; Fig. 6, a broken transverse vertical section taken as indicated at line 6 of Fig. 2 and showing a rotary cutter, the bar which carries it and the gear-train which operates it; and Fig. 7, a broken sectional view indicating the movements of the cutter-carrying bar and the cutter with relation to the caramel-strip during the severing operation.

In the construction shown, A represents a frame provided with the usual table-top $A^1$; B, a rotary carrier equipped with peripheral receptacles and whose function is to carry the caramels during the wrapping operations, as fully described in the above-mentioned application; $B^1$, a local group of folders coöperating with the wheel B in the manner described in said application; $B^2$, a discharge-chute; $B^3$, an ejector-actuating rod operating in the manner described in said application; $B^4$, a plunger serving to deliver the caramels to the peripheral receptacles of the carrier in a well known manner; C, the main drive-shaft of the machine which extends transversely beneath the top of the frame near the front edge of the machine and is supported in suitable hangers beneath the frame-top; D, mechanism for receiving the candy material in bulk and forming the same into a strip; $D^1$, mechanism for applying starch-dust to the strip of material as it passes to the sizing mechanism; E, mechanism for sizing the strip and feeding it to the cutting mechanism and including a chute $E^1$; F, cutting mechanism for severing the strip into cubes; and G, mechanism for moving the caramels rearwardly from the cutter, through the chute $G^1$ to a position beneath the plunger $B^4$, which serves to depress the caramels together with the wrappers into the peripheral receptacles of the rotary carrier B in a well understood manner.

The frame A may be of any suitable construction. As shown, it is substantially like the frame shown in the above-mentioned application, although modified somewhat to support the novel mechanisms which will be hereinafter described.

The construction and operation of the rotary carrier B and the mechanism coacting therewith for folding the wrappers and discharging the wrapped caramels through the chute $B^2$ is fully described in the above-mentioned application, no novel features pertaining to this mechanism being claimed in the present application.

The shaft C is equipped with the usual cams for actuating the wrapping mechanism and with the usual means for actuating the rotary carrier B, the plunger $B^4$ and the paper-feeding and severing mechanism (not shown). All of these parts and their operation are now well understood. The shaft C is also equipped with an eccentric $c$ for operating the feeding and sizing rolls of the mechanism E in the manner described in the above-mentioned application. Said shaft is additionally equipped with a peripherally grooved wheel $c^1$ which serves in the actuation of the mechanism $D^1$; and it is also additionally equipped with a gear-segment $c^2$ which serves in the actuation of the cutting mechanism F.

The mechanism D for forming the caramel-strips from the material in bulk comprises a casing $d$ equipped with a hopper $d^1$ and provided internally with a stationary spiral rib or screw $d^2$; a rotating screw or propeller $d^3$ within the casing $d$ and having a shaft projecting in front of the front end of the casing and equipped with a gear $d^4$; and a stub-shaft $d^5$ equipped with a gear $d^6$ engaging the gear $d^4$, said shaft $d^5$ being equipped also with a drive-pulley $d^7$. The rear end of the casing $d$ is reduced or tapered to provide a discharge orifice $d^8$, which is of substantially rectangular cross-section.

The mechanism $D^1$ comprises simply a pair of horizontally disposed transversely extending dusting rolls $d^9$, $d^{10}$, whose shafts are equipped respectively with grooved wheels $d^{11}$, $d^{12}$, connected by a belt $d^{13}$ with the grooved wheel $c^1$ on the shaft C.

The mechanism E comprises, in addition to the horizontally disposed longitudinally extending chute $E^1$, a pair of feeding and sizing rolls $e$ disposed one above and the other beneath the chute $E^1$ and fixedly secured on horizontally disposed transversely extending shafts $e^1$ which are connected by gears $e^2$; and ratchet mechanism $e^3$ connected with the uppermost shaft $e^1$ and joined by a connecting rod $e^4$ to the eccentric $c$, said ratchet mechanism serving to actuate the feeding and sizing rolls $e$ intermittently in the manner described in the above-mentioned application. The chute $E^1$ is located a short distance above the table-top $A^1$ and is in alinement with the discharge end of the casing D. The bottom of the chute is provided with a slot $e^5$ through which the upper portion of the lower roll $e$ projects slightly. The chute $E^1$ has stationary side flanges $e^6$ which diverge forwardly, and the space between which is somewhat smaller than the lateral or horizontal dimension of the orifice $d^8$, so that the members $e^6$ serve to compress the strip in one direction while the rolls $e$ serve to compress it in a direction at right-angles thereto.

The mechanism F comprises a transversely reciprocable bar $f$ movable in guides $f^1$ with which the table-top is equipped on its upper side; a rotary cutter $f^2$ secured on a horizontal shaft $f^3$ journaled in the bar $f$ and equipped with a pinion $f^4$; pinions $f^5$, $f^6$, journaled on the bar $f$ and serving to transmit motion to the pinion $f^4$; a gear $f^7$ meshing with the pinion $f^6$ and secured on a shaft $f^8$ journaled in a head $f^9$ with which the bar $f$ is provided; a pinion $f^{10}$ fixed on the opposite end of the shaft $f^8$; a stationary rack $f^{11}$ carried by the table-top and with which the pinion $f^{10}$ meshes; a connecting rod $f^{12}$ connected with the head $f^9$ and through the medium of which the slide, or bar, $f$ is reciprocated; a crank-shaft $f^{13}$ extending longitudinally of the machine and equipped with a crank $f^{14}$ with which the rod $f^{12}$ is connected; a bevel gear $f^{15}$ on the front end of the shaft $f^{13}$ meshing with a bevel gear $f^{16}$ on a stub-shaft $f^{17}$ journaled in bearings $f^{18}$ mounted upon the table-top, the shaft $f^{17}$ extending at right-angles to the shaft $f^{13}$ and located directly above the main driving shaft C; and a gear $f^{19}$ fixed on the shaft $f^{17}$ and adapted to be intermittently actuated by the gear-segment $c^2$ mounted on the shaft C. The bar $f$ is so disposed as to extend transversely beneath the rear portion of the chute $E^1$ in the rear of the feeding and sizing rolls $e$, and the rotary cutter $f^2$ is so located on the bar $f$ that as the bar is reciprocated the upper portion of the rotary cutter will be carried across the path of the caramel-strip. The gearing is such that as the cutter is moved across the path of the caramel-strip in the cutting operation, the upper, or operative, part of the cutter will move or rotate in a direction opposed to the direction of bodily movement of the cutter, as illustrated in Fig. 7. The cutter is given a positive rotation as well as a bodily movement during the cutting operation, and the result is that a smooth clean cut of the caramel-strip is effected without objectional gumming of the cutter.

The mechanism G for moving the caramel, after severance from the strip, rearwardly to the path of the plunger $B^4$ is exactly like the mechanism for effecting the same function described in the above-mentioned application. This mechanism includes a feed-finger $g$ carried by a reciprocating slide $g^1$ which is actuated by a connecting rod $g^2$. The slide $g^1$ is equipped with a cam-arm $g^3$ which coacts with a pivoted cam $g^4$, with which is connected a spring $g^5$—all as fully described and claimed in the above-mentioned application. The chute $G^1$ is in alinement with the chute $E^1$ and virtually forms a continuation thereof. However, the front end of the chute $G^1$ is separated from the rear end of the chute E¹ by a small space g⁶ which serves to admit the rotary cutter and the opposed feed-finger to the path of the caramel-strip. It is understood, of course, that the parts are so timed that the feed-finger enters the space between the caramel and the caramel-strip after the cutter recedes after having severed the caramel from the strip.

The operation will be readily understood from the foregoing description. Power is applied to the pulley d⁷ and to a pulley c³ on the shaft C from any suitable source. The material, or "dough", H is placed in the hopper d¹ and is fed through the cylinder d by the screw propeller d³, being forced from or pressed out of the orifice d⁸ in the form of a strip of plastic material. Upon the emergence of the strip indicated by H¹, it enters between the dusting rolls D¹ and thence passes into the chute E¹ and between the feeding and sizing rolls e, being compressed on two sides between said rolls and at the same time drawn between the fixed side-members e⁶ of the chute E¹ and thereby compressed on the remaining two sides. At the proper moment, the rolls e cease their action and the bar f advances to carry the cutter across the path of the caramel-strip and sever the caramel H² from the strip. During the advance movement of the bar f, the upper or operative portion of the rotary cutter moves or rotates in a direction opposed to the direction of bodily movement of the cutter. Upon the recession of the cutter, the feed-finger drops into the space between the caramel and the caramel-strip, and upon the rearward movement of the slide g¹, the feed-finger operates to move the caramel rearwardly through the chute G¹ to a position beneath the plunger B⁴, which thereupon operates to depress the caramel into a peripheral receptacle of the rotary carrier B, it being noted that in the meantime the usual paper-feeding and severing means has operated to supply a wrapper between the plane of the chute G¹ and the uppermost receptacle, so that when the plunger depresses the caramel into the uppermost receptacle, the wrapper is at the same time depressed into the receptacle, and two folds of the wrapper effected. The successive folding operations of the wrapper and the discharge of the wrapped caramel through the chute D² require no description here.

The advantage of combining mechanism for forming a strip from material in bulk with mechanism for sizing the strip, severing it into cubes and then wrapping the cubes will at once be appreciated by those skilled in the art. This arrangement not only obviates the necessity of rolling the material into sheets and severing it into strips, but also overcomes many difficulties inherent in handling the detached strips and feeding them properly into a wrapping machine.

The foregoing detailed description has been given for clearness of understanding only, and no undue limitation is to be understood therefrom.

What I regard as new, and desire to secure by Letters Patent, is—

1. In a machine of the character described, the combination of a cylinder equipped with a hopper and provided with a discharge-outlet, a screw-propeller in said cylinder, a pair of dusting rolls located adjacent to said outlet, a chute in the rear of said rolls and having flaring side flanges serving to compress the strip on two sides, a pair of feeding and sizing rolls coöperating with said chute and serving to compress the chute on the remaining two sides, and means for severing the strip of material into blocks.

2. In a machine of the character described, the combination of mechanism for forming a plastic strip from material in bulk, feeding and sizing mechanism for receiving the strip from said first-named mechanism, a cutter in the rear of said feeding and sizing mechanism for severing the strip into articles to be wrapped, a chute in the rear of said cutter in alinement with the feeding and sizing mechanism, a rotary carrier equipped with peripheral receptacles, a plunger for depressing the articles into said receptacles, and a reciprocating feed-finger operating to move the articles rearwardly from the cutter through said chute to the path of said plunger.

3. The combination of mechanism for forming a plastic strip from material in bulk, a chute receiving said strip and having stationary curved side flanges serving to compress the strip on two sides, a pair of feeding and sizing rolls coöperating with said chute and serving to compress the strip on the remaining two sides, and a cutter in the rear of said rolls serving to sever the strip into blocks.

4. In a caramel-wrapping machine of the character described, the combination with a guide and means for feeding a strip of material along the guide, of a longitudinally reciprocable member operating transversely of the guide, guides on the machine in which said member is reciprocated, a rotatable cutter on said member, power-actuated means for reciprocating said member and positively rotating the cutter, and means for feeding the caramel-cubes to the carrier and coacting paper folding device for the purpose set forth.

5. In a caramel-wrapping machine, the combination with a guide, and means for feeding a strip of material along the guide, of a reciprocable bar, guides on the machine by which said bar is guided to be moved transversely of said first-named guide, a rack on the machine, a rotatable cutter on said bar movable into the path of movement of the strip of material fed through the guide, gear mechanism engaging with said cutter and said rack and serving to rotate the cutter when the bar is reciprocated, and power-actuated means for reciprocating said bar to cause the cutter to intermittently engage with said strip.

6. In a machine of the character described, the combination with a guide, and means for feeding a strip of material along the guide, of a longitudinally reciprocable bar, guides on the machine by which said bar is guided to be moved transversely of said first-named guide, a rotatable cutter on said bar movable into the path of movement of the strip of material fed through the guide, and means for reciprocating said bar and rotating said cutter to cause the latter to intermittently engage with said strip.

7. In a machine of the character described, the combination with a guide, and means for feeding a strip of material along the guide, of a rotatable cutter, and means for moving said cutter transversely of and bodily across the path of the strip and simultaneously therewith rotating the engaging or operative portion of the cutter in the direction opposite the direction of bodily movement in the cutting operation.

8. In a machine of the character described, the combination of a frame, a rotary carrier journaled therein and projecting above the top of the frame, a plunger located above said carrier, a chute located above said frame and provided with a transverse slot, means for feeding a strip of material through said chute, a transversely reciprocable bar located between said chute and the frame-top, a rotary cutter mounted on said bar with its upper portion adapted to move through said slot, and means for rotating the cutter during reciprocation of the bar, for the purpose set forth.

9. In a machine of the character described, the combination of a frame, a rotary carrier supported thereon and projecting above the frame-top and equipped with peripheral receptacles, means coacting with said rotary carrier for effecting folds of a wrapper, a plunger located above the rotary carrier, a horizontally disposed chute located in a plane above the rotary carrier, means for feeding a strip of material through said chute, a rotating reciprocable cutter having its upper portion operative to sever the strip into blocks, and a reciprocating feed-finger located above the cutter and operative to enter the space between the severed block and the strip and move the block rearwardly to the path of the plunger, for the purpose set forth.

10. In a machine of the character set forth, the combination of a carrier provided with orbitally-moving pockets, means operative to depress confections into said pockets, wrapping mechanism coöperating with said carrier, means for feeding a confection-strip into the machine, a rotatable cutter, a reciprocatory support for said cutter, and power-actuated means for reciprocating said support for moving said cutter bodily across the path of said strip and for simultaneously therewith rotating the engaging or operative portion of the cutter in the direction opposite the direction of bodily movement in the cutting operation.

11. In a machine of the character set forth, the combination with a carrier provided with orbitally-moving pockets, means operative to depress confections into said pockets, wrapping mechanism coöperating with said carrier, means for feeding a confection-strip into the machine, a rotatable cutter, and means for reciprocating said support to move the cutter, a reciprocatory support for said cutter, bodily across the path of said strip and positively rotating the cutter during the cutting operation.

12. In a machine of the character set forth, the combination of a strip-feeding guide, strip-feeding rolls alined therewith, a transversely reciprocable bar, a rotatable cutter mounted on said bar, a pinion for rotating said cutter, a stationary rack engaging said pinion, and an operating shaft geared to said strip-feeding rolls and to said reciprocable bar.

13. In a machine of the character set forth, the combination of a strip-feeding guide, strip-feeding rolls alined therewith, a transversely reciprocable bar, a rotatable cutter mounted on said bar, a pinion for rotating said cutter, a stationary rack engaging said pinion, an operating shaft geared to said strip-feeding rolls and to said reciprocable bar, a carrier provided with orbitally moving pockets, paper-feeding mechanism, means for depressing the confections into said pockets, and wrapping mechanism coacting with said carrier.

JOHN W. HICKS.

In presence of—
J. H. LANDES,
R. A. SCHAEFER.